(12) United States Patent
Larson

(10) Patent No.: US 11,292,411 B2
(45) Date of Patent: Apr. 5, 2022

(54) ADJUSTABLE ROTARY BRUSH

(71) Applicant: Caterpillar Paving Products Inc., Brooklyn Park, MN (US)

(72) Inventor: Jason B. Larson, Zimmerman, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 12 days.

(21) Appl. No.: 16/694,725

(22) Filed: Nov. 25, 2019

(65) Prior Publication Data

US 2021/0155182 A1 May 27, 2021

(51) Int. Cl.
*E01C 19/12* (2006.01)
*B60R 19/54* (2006.01)

(52) U.S. Cl.
CPC .............. *B60R 19/54* (2013.01); *E01C 19/12* (2013.01); *E01C 2301/00* (2013.01)

(58) Field of Classification Search
CPC ......... B60R 19/54; E01C 19/12; E01C 19/48; E01C 2301/00
USPC .............................................. 404/72, 75, 118
See application file for complete search history.

(56) References Cited

U.S. PATENT DOCUMENTS

| | | | | |
|---|---|---|---|---|
| 3,605,579 A * | 9/1971 | Hetzel | ..................... | E01C 19/43 404/93 |
| 3,675,543 A * | 7/1972 | Neal | ........................ | E01C 19/48 404/118 |
| 4,315,700 A * | 2/1982 | Heiligtag | .............. | E01C 19/174 172/439 |
| 4,966,490 A * | 10/1990 | Hodson | ................... | E01C 19/16 118/103 |
| 6,086,287 A | 7/2000 | Sharpe | | |
| 8,931,974 B2 * | 1/2015 | Herzberg | ................ | E01C 19/00 404/84.05 |
| 9,004,811 B2 * | 4/2015 | Mings | ..................... | G01S 15/88 404/84.5 |
| 9,011,038 B2 * | 4/2015 | Buschmann | ............ | E01C 19/48 404/84.05 |
| 10,309,069 B1 * | 6/2019 | Smith | ..................... | E01H 1/045 |
| 2002/0122694 A1 * | 9/2002 | Obermeyer | ............ | E01C 19/48 404/101 |
| 2003/0143024 A1 | 7/2003 | Sharpe | | |
| 2005/0102778 A1 * | 5/2005 | Gregerson | ............. | E01H 1/056 15/82 |
| 2008/0292398 A1 * | 11/2008 | Potts | ...................... | E01C 19/48 404/83 |

(Continued)

FOREIGN PATENT DOCUMENTS

| | | |
|---|---|---|
| CN | 205617294 U | 10/2016 |
| JP | 02914134 B2 | 6/1999 |
| KR | 1565234 B1 | 11/2015 |

*Primary Examiner* — Raymond W Addie

(74) *Attorney, Agent, or Firm* — von Briesen & Roper, s.c.

(57) ABSTRACT

A rotary brush assembly for a paving machine may comprise a frame mount for mounting the rotary brush assembly to a chassis frame of the paving machine, as well as a plurality of adjustable mounting arms. The rotary brush assembly may further include a motor having a drive shaft. A pair of mounting plates may be coupled to the drive shaft. The rotary brush assembly may further include a plurality of blades. Each blade may include a mounting end installed between the pair of mounting plates, as well as an opposite free end.

20 Claims, 5 Drawing Sheets

(56) References Cited

U.S. PATENT DOCUMENTS

2012/0253612 A1* 10/2012 Byrne ................. E01C 19/4853
                                                                701/50
2013/0322965 A1* 12/2013 Frelich .................... E01C 19/48
                                                               404/108
2020/0018634 A1*  1/2020 Fickeisen ................ E01C 19/48

* cited by examiner

ADJUSTABLE ROTARY BRUSH

TECHNICAL FIELD

The present disclosure relates generally to paving machines, and, more specifically, to rotary brush attachments for paving machines.

BACKGROUND

Paving machines are used to lay and level a paving material, such as asphalt, on a ground surface for the construction of roads, bridges, parking lots, and other such surfaces. In general, paving machines include a chassis, a hopper for storing the paving material, an auger that distributes the paving material on a ground surface, and a screed assembly that compacts and levels the paving material to a desired mat thickness. The paving material is typically added to the hopper via a supply vehicle, such as a dump truck, although depending on work site conditions, paving material may also be transferred to the hopper via an elevator, conveyor belt, or other transfer method.

Regardless of the method used, while loading paving material in the hopper, spillage often occurs. If the paving machine drives over the spillage, the resulting asphalt mat may be uneven or defective. Furthermore, sensing components mounted on the paving machine may detect the spillage, causing the paving system to make adjustments to the paving mat, resulting a diminished uniformity of the asphalt being laid. As such, it is important to remove spillage from the path of drive wheels or tracks of the paving machine. Removal of spillage is typically accomplished manually, requiring a site worker to shovel the spillage out of the path of the paving machine.

Prior art attempts to resolve issues associated with spillage have been directed to strike-off plows installed proximate the screed assemblies or hopper systems utilizing flaps or shields that attempt to prevent spillage from occurring in the first place. However, strike-off plows have little to no range of motion, as they are typically designed to provide a preliminary leveling of the ground surface prior to paving. While certain hopper systems attempt to utilize flaps or shields to prevent spillage from occurring, these systems fail to take into account varying designs of paving machines and varying sources of paving material. For example, different paving material suppliers (e.g. dump truck, conveyor belt, etc.) may provide paving material to the hopper at different velocities and angles, which results in spillage despite the flaps or shields utilized. Examples of prior art paving machines utilizing these systems are U.S. Pat. Nos. 9,580, 875 and 9,909,267.

There is consequently a need for an assembly that not only removes spillage and other debris from the path of a paving machine, but which is also fully adjustable by an operator of the paving machine.

SUMMARY

In accordance with one aspect of the present disclosure, a paving machine is disclosed. The paving machine may be configured for paving a ground surface, and may comprise a chassis frame, a plurality of ground engaging mechanisms, a hopper mounted to the chassis frame and configured to receive paving material, and a rotary brush assembly. The rotary brush assembly may include a frame mount for mounting the rotary brush assembly to the chassis frame and a mounting arm coupled to the frame mount. A motor coupled to the mounting arm may include a drive shaft extending from the motor through a mounting plate. The drive shaft may define an axis of rotation. A plurality of blades may extend radially outward from the drive shaft axis, with each blade including a mounting end mounted to the mounting plate and an opposite free end.

In accordance with another aspect of the present disclosure, a rotary brush assembly for use with a paving machine is disclosed. The rotary brush assembly may comprise a frame mount for mounting the rotary brush assembly to a chassis frame of the paving machine and a plurality of adjustable mounting arms. The rotary brush may also include a motor having a drive shaft. A pair of mounting plates may be coupled to the drive shaft. The rotary brush may also include a plurality of blades, each blade including a mounting end installed between the pair of mounting plates and an opposite free end.

In accordance with yet another aspect of the present disclosure, a method of paving using a rotary brush assembly with a plurality of blades is disclosed. The method may comprise transferring paving material from a supply source into a hopper of a paving machine. The paving machine may have a ground engaging mechanism. The method may further comprise spilling a portion of the paving material into a path of the ground engaging mechanism, engaging, by an edge of a blade of the plurality of blades, the spilled paving material, and sweeping, by the plurality of blades, the spilled paving material out of the path of the ground engaging mechanism. The method may further comprise paving a portion of a ground surface with the transferred paving material.

These and other aspect and features of the present disclosure will be better understood upon reading the following detailed description when taken in conjunction with the accompanying drawings.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts.

Figure 1:
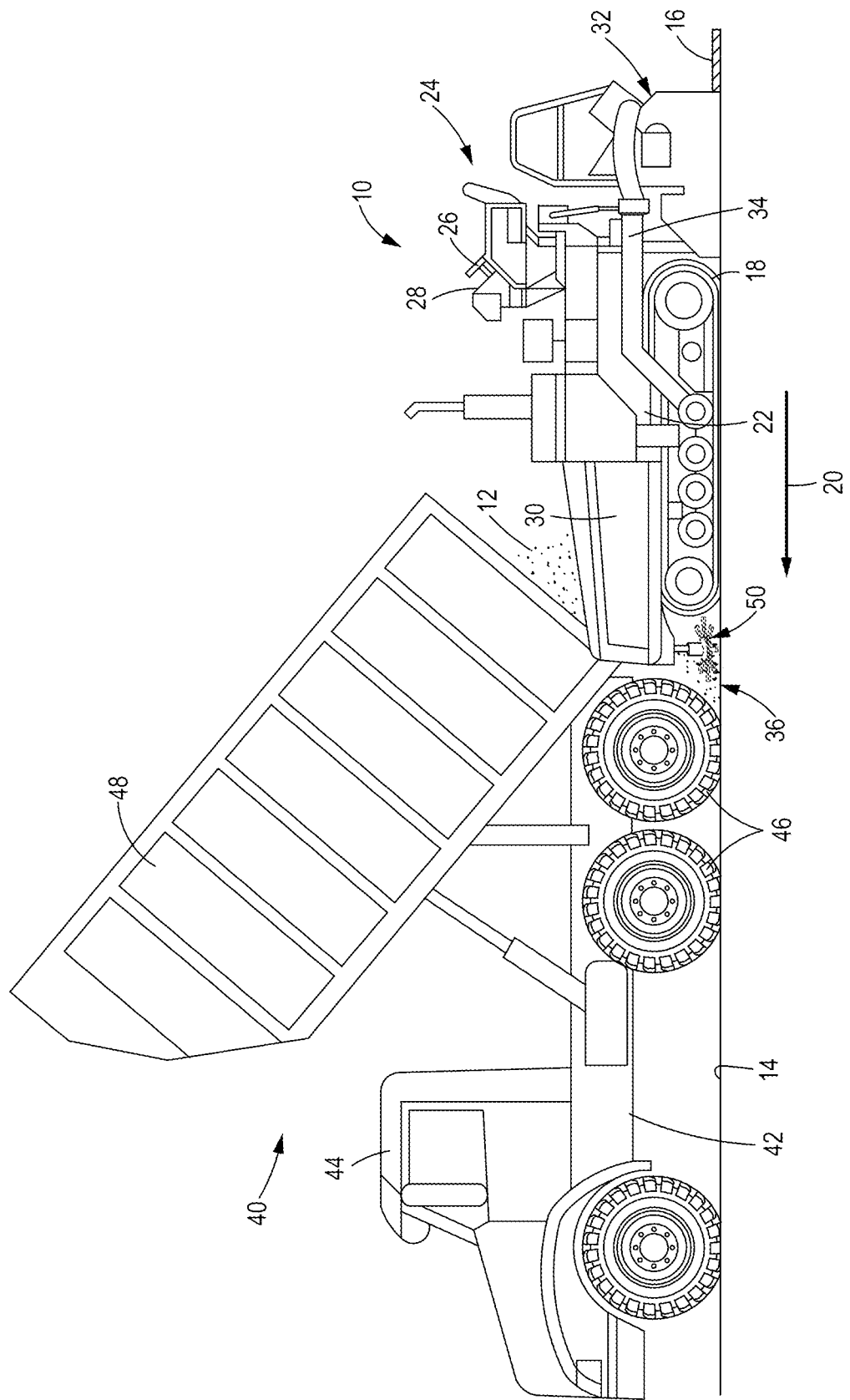
FIG. 1 is a side view of a supply vehicle and a paving machine having a rotary brush assembly constructed in accordance with the present disclosure.

FIG. 1 illustrates a side view of a paving machine 10 operated in conjunction with a material supply machine 40, according to an embodiment of the present disclosure. The paving machine 10 may be used to level and compact a paving material 12, such as asphalt, on a surface of the ground 14 to provide a layer 16 of paved material. The paving machine 10 may also include at least one ground engaging mechanism 18 driven by a prime mover such as an engine (not shown). In the illustrated embodiment, the paving machine 10 is a track-equipped paver; however, in other embodiments, the paving machine may be a wheel-equipped paver. As used herein, a "front" position refers to a forward position on the paving machine 10 in a forward direction of travel 20 of the paving machine, while a "rear" position refers to a rearward position on the paving machine with respect to the direction of travel of the paving machine.

The paving machine 10 generally includes a chassis 22, as well as an operator station 24 mounted on the chassis. The operator station 24 may include a plurality of input devices 26 for controlling the paving machine 10 and a rotary brush assembly 50, as well as at least one display device 28 for displaying information related to the operation of the paving machine and a paving operation. A hopper 30, disposed adjacent the front of the paving machine 10, stores the paving material 12, and a distributing device (not shown), such as an auger, distributes the paving material 12 onto the ground surface 14. The paving machine 10 may further include a screed assembly 32 configured to level and compact the paving material 12 on the ground surface 14. The screed assembly 32 is disposed at a rear end of the paving machine 10, and is mounted to the chassis 22 via one or more arms 34.

In the illustrated embodiment, the paving machine 10 is operated in conjunction with the material supply machine 40, which transports and supplies the paving material 12 to the paving machine 10. While the material supply machine 40 is illustrated herein as a dump truck, in other embodiments, the material supply machine may be a conveyor belt, elevator, or any other material transport and supply system. The material supply machine 40 may include a chassis 42 that supports a prime mover, such as an engine (not shown) and an operator cab 44. The engine may be operatively connected to a ground engaging mechanism 46, such as wheels or tracks. A material transport body 48, such as a dump unit, may be pivotably mounted to the chassis 42, and receives a payload to be hauled from one location to another.

As depicted in FIG. 1, during a paving operation, the paving machine 10 may be supplied with paving material 12 from the material supply machine 40. The paving machine 10 and the material supply machine 40 may be aligned, so as to ensure the paving material 12 is properly transferred to the hopper 30 of the paving machine, and to limit spillage of the paving material onto the ground surface 14. In some instances, the paving machine 10 and the material supply machine 40 may remain stationary during transfer of the paving material 12 from the material supply machine to the hopper 30 of the paving machine. In other instances, however, the paving machine 10 may push the material supply machine 40 while the paving machine is simultaneously applying a layer of paving material 12 and the material supply machine is loading paving material into the hopper 30 of the paving machine.

At any time during the paving operation, paving material 12 may spill from either or both of the material supply machine 40 and the paving machine 10. The spillage, indicated for exemplary purposes only at 36, can disrupt sensor systems (not shown) and can cause defects in the paving mat 16 if it is not removed from the path of the ground engaging mechanisms 18. The paving machine 10 therefore includes the rotary brush assembly 50, which is positioned in front of the ground engaging mechanisms 18, in order to sweep or transport spillage out of the path of the ground engaging mechanisms. While only one rotary brush assembly 50 is shown in FIG. 1, other arrangements may include multiple rotary brush assemblies 50. Preferably, one or more rotary brush assemblies 50 may be installed in front of each ground engaging mechanism, although additional rotary brush assemblies may be installed behind or between the ground engaging mechanisms 18 as well.

Figure 2:
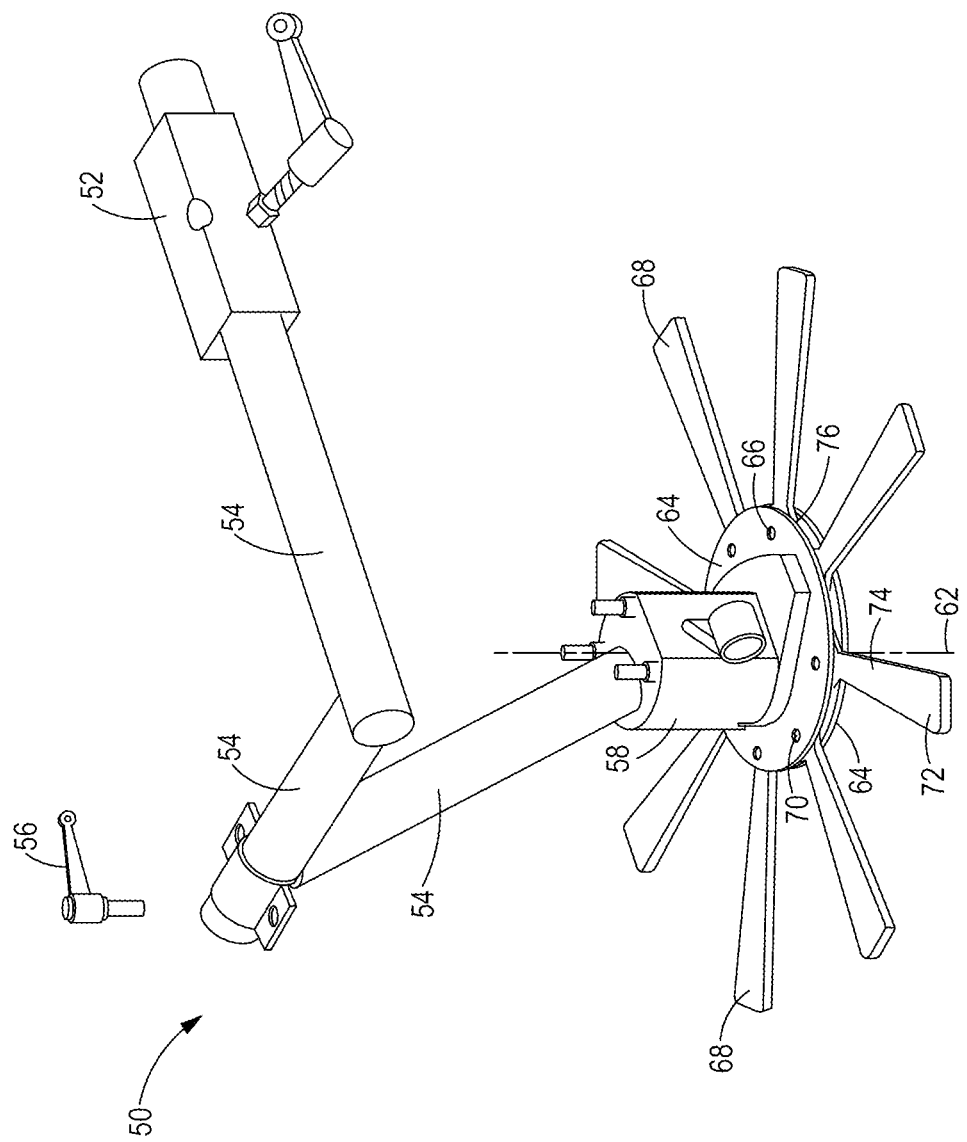
FIG. 2 is an elevated partially exploded view of the rotary brush assembly of FIG. 1 shown in isolation and constructed in accordance with the present disclosure.

Referring now to FIG. 2, an elevated partially exploded view of the rotary brush assembly 50 is shown in more detail. In the depicted arrangement, the rotary brush assembly 50 includes a frame mount 52 and a plurality of mounting arms 54. A plurality of locking levers 56 may secure at least one of the mounting arms 54 within the frame mount 52, and may also secure the mounting arms to each other. Further, the rotary brush assembly may include a motor 58 fixed to one of the mounting arms 54. The motor 58 may be electric or hydraulic. The motor 58 may include a drive shaft 60 (FIG. 4) that defines a rotational axis 62. The drive shaft 60 extends from the motor through a plurality of mounting plates 64. Each mounting plate 64 may be generally circular in shape and include a plurality of mounting apertures 66 proximate a circumferential edge of each mounting plate.

The rotary brush assembly 50 may further include a plurality of blades 68 that extend radially outward from the rotational axis 62. The blades 68 may be mounted to the mounting plates 64 using a plurality of fasteners 70, such as bolts. In other arrangements, the mounting plates 64 and plurality of blades may be welded together, or may be formed from a single uniform piece of material. Preferably, however, the mounting plates 64 are made of a rigid material, such as a metal or metallic alloy (e.g. steel), and the blades 68 are made of a material that is flexible, but rigid enough to engage spillage and transport the spillage out of the path of the ground engaging mechanisms 18 (e.g. resilient plastic, rubber or rubber belting). Each blade 68 may be generally rectangular in shape, having a free end 72 that may be wider than a middle section 74. A mounting end 76, opposite the free end 72, may also be wider than the middle section 74, to provide sufficient surface area for secure installation between the mounting plates 64.

Figure 3:
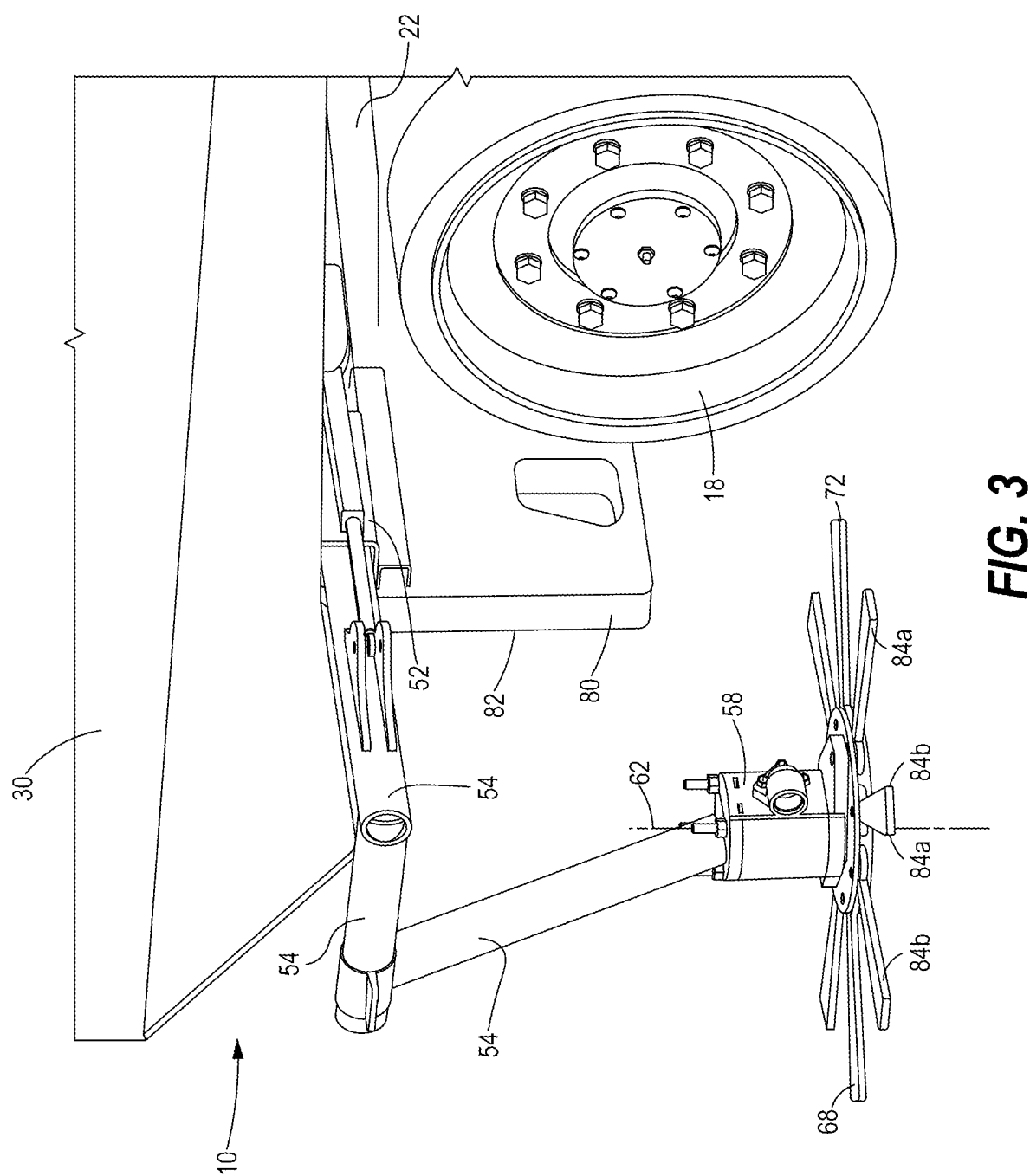
FIG. 3 is a perspective view of the rotary brush assembly of FIG. 1, constructed in accordance with the present disclosure.

Referring now to FIG. 3, the present rotary brush assembly 50 is shown installed on the paving machine 10 in front of one of the ground engaging mechanisms 18. More specifically, the rotary brush assembly 50 may be fixed using a plurality of fasteners (not shown) and/or by welding to the chassis 22 or to a rear side 78 of a front bumper 80 of the paving machine 10. While the rotary brush assembly 50 is shown installed to the rear side 78 of the front bumper 80, in other arrangements, the rotary brush assembly may be fixed to a front side 82 of the front bumper. As further shown in FIG. 3, the mounting arms 54 may be hydraulic, and may be connected to a hydraulics system of the paving machine 10. In this embodiment, a controller (not shown) may control movement of the rotary brush assembly 50 using input received from an operator of the paving machine. More specifically, the operator of the paving machine 10 may use the input devices 26 of the operator station 24 to selectively extend and retract the rotary brush assembly 50 between an extended position and a retracted position, and to selectively position the rotary brush assembly at varying angles with respect to the ground surface 14. Alternatively, the position and angle of the rotary brush assembly 50 may be manually set, or a combination of both controller and manual manipulation may be used. For example, the angle of the rotary brush assembly 50 may be manually set and locked in place using the plurality of locking levers 56, while extending and retracting the rotary brush assembly may be completed by an operator of the paving machine 10 using the controller and input devices 26.

Figure 4:
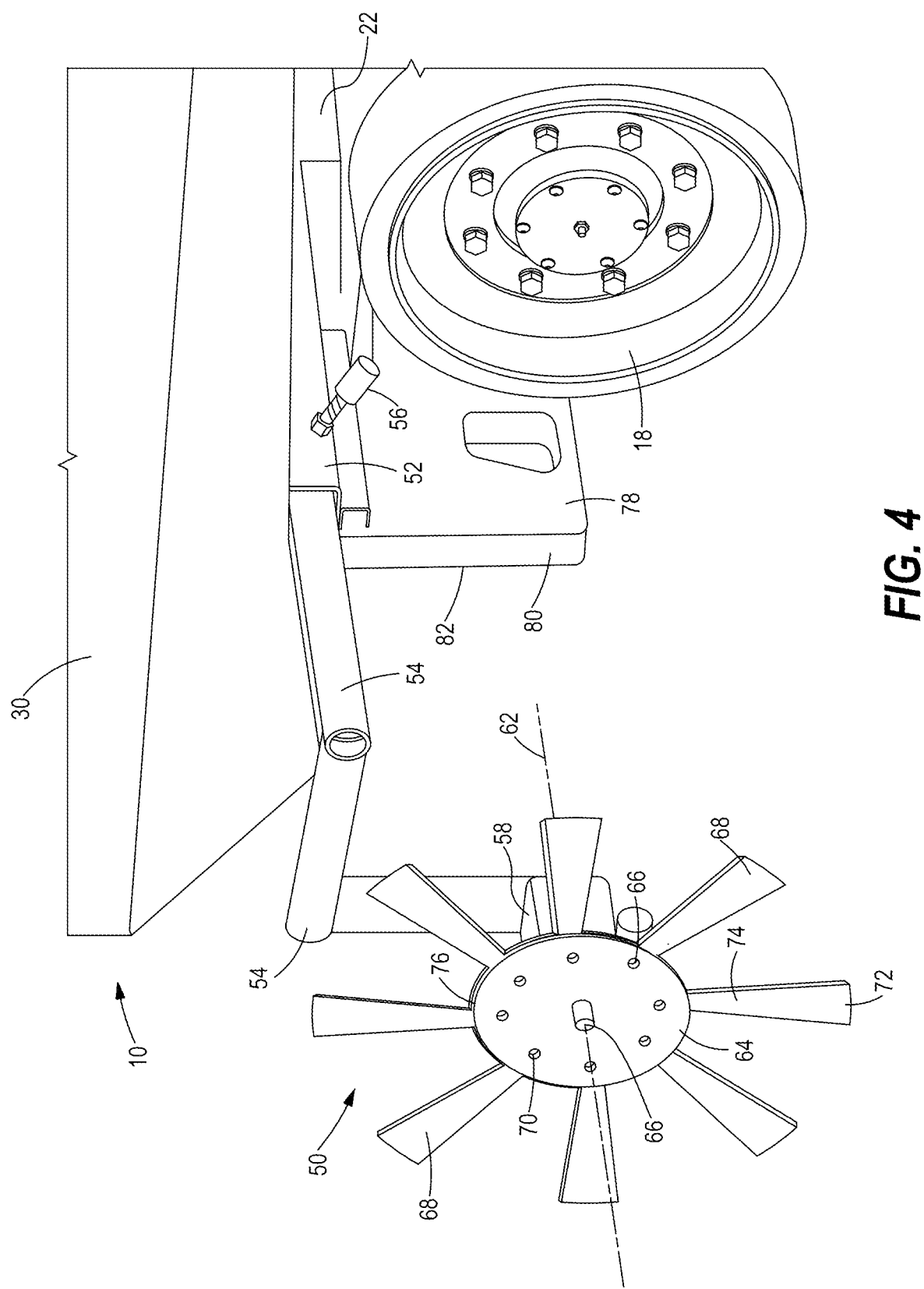
FIG. 4 is a perspective view of the rotary brush assembly of FIG. 1, shown in an angled position, constructed in accordance with the present disclosure.

Referring now to FIGS. 3 and 4, the operator of the paving machine 10 may use the input devices 26 of the operator station 24 to selectively extend and retract the rotary brush assembly 50 between an extended position and a retracted position, and to selectively position the rotary brush assembly at varying angles with respect to the ground surface 14. Similarly, the operator of the paving machine 10 may set the rotational direction (i.e. clockwise or counter-clockwise) of the blades 68. Alternatively, the position and angle of the rotary brush assembly 50 may be manually set, or a combination of both controller and manual manipulation may be used. For example, the angle of the rotary brush assembly 50 may be manually set and locked in place using the plurality of locking levers 56, while extending and retracting the rotary brush assembly may be completed by an operator of the paving machine 10 using the controller and input devices 26. In FIG. 3, for example, the rotary brush assembly 50 is shown in an extended position, with the mounting plates 64 being parallel or coplanar with the ground surface 14. In FIG. 4, for example, the rotary brush assembly is shown in an extended position, with the mounting plates arranged perpendicular to the ground surface 14.

INDUSTRIAL APPLICABILITY

In practice, the teachings of the present disclosure may find applicability in many industries including, but not limited to, construction and earth moving equipment. As one particular example, the present disclosure may be beneficial to paving machines. The present disclosure provides a paving machine with a rotary brush assembly attachment that sweeps spillage and other debris away from wheels or tracks of the paving machine, thereby preventing uneven, incomplete or partial distribution of paving material.

Figure 5:
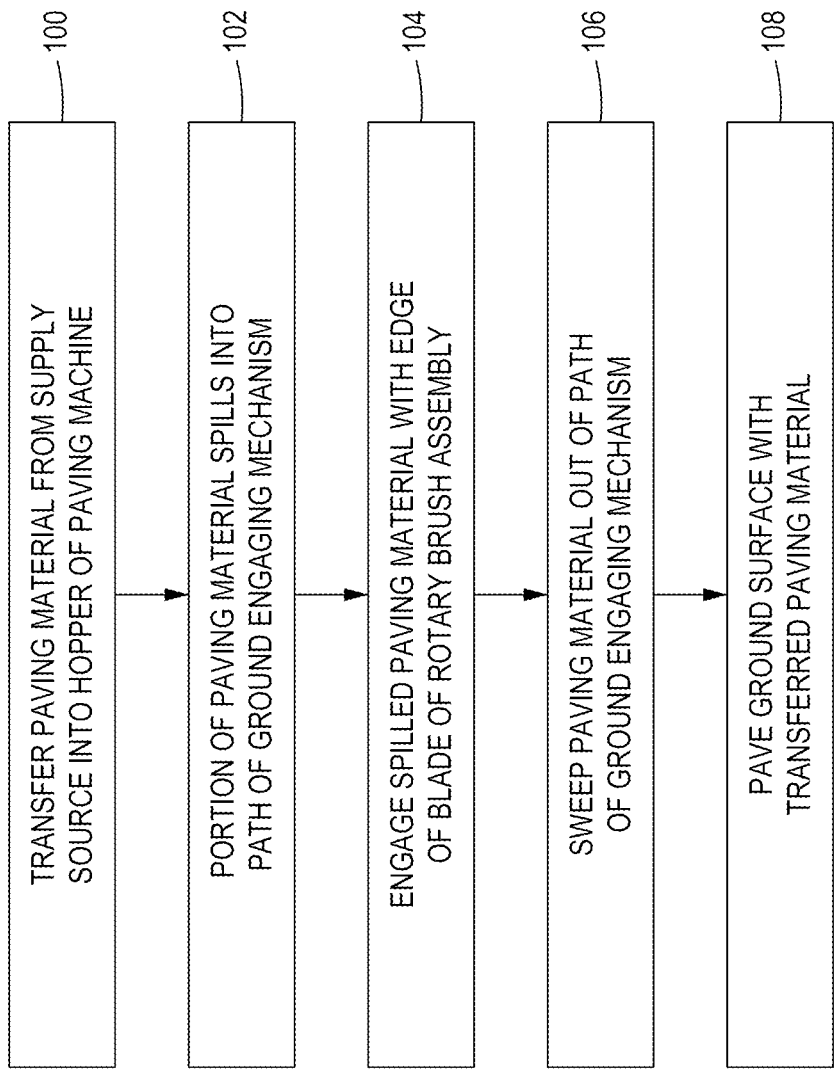
FIG. 5 is a flowchart of an embodiment of a series of steps for paving using a rotary brush assembly, in accordance with a method of the present disclosure.

A series of steps involved in paving the ground surface 14 using the rotary brush assembly 50 is illustrated in a flowchart format in FIG. 5. As shown therein, in a first step 100, paving material 12 may be transferred from a supply source, such as the material supply machine 40, to the hopper 30 of the paving machine 10. While this step may be accomplished using the material supply machine 40, it may also be accomplished by transporting the paving material 12 to the hopper 30 using a conveyor belt, an elevator, or any means known in the art for transporting materials at a work site. The paving material 12 may include asphalt, but other paving materials such as concrete, gravel, or brick are also considered. A portion of the paving material 12, or spillage, may fall into the path of the ground engaging mechanisms 18 of the paving machine 10, as in a second step 102.

At any time prior to a step 104, an operator of the paving machine 10 may provide power to the motor 58 of the rotary brush assembly 50, such that the blades 68 begin rotating. For example, the rotary brush assembly 50 may be operated constantly while the engine of the paving machine is turned on, or the rotary brush assembly may be operated sporadically, as needed. The operator may set or change the rotational direction of the blades 68, the angle of the mounting plates 64, and the position of the mounting arms 54 at any time during operation of the rotary brush assembly 50. This may be accomplished manually, or by using the input devices 26 in the operator station 24.

While rotating, a leading edge 84a, 84b of each blade 68 may engage the spilled paving material 36 in the step 104. The leading edge 84a, 84b of the blades 68 will vary, depending on the direction of rotation of the blades. For example, with reference to FIG. 3, when the blades 68 rotate clockwise, the leading edge of each blade 68 is indicated at 84a. Conversely, when the blades 68 rotate counter-clockwise, the leading edge of each blade 68 is indicated at 84b. As the leading edge 84a, 84b engages the spilled paving material 36, each blade 68 may contact the paving material and deform or warp in order to surround and capture a portion of the spilled paving material during rotation.

In step 106, the captured portion of spilled paving material 36 may be swept out of the path of the ground engaging mechanisms 18. The direction of rotation and angle of the blades 68 determines where the spilled paving material 36 may be swept. For example, the operator of the paving machine 10 may set the angle and rotation of the rotary brush assembly 50 such that the spillage is swept under the chassis 22 of the paving machine. In this arrangement, the spillage may be incorporated into the paving mat 16 as the screed assembly 32 passes over the swept spillage. Alternatively, the operator of the paving machine 10 may set the angle and rotation of the rotary brush assembly 50 such that the spillage is swept away from the paving machine altogether.

As the paving machine 10 travels in the forward direction, paving material 12 is permitted to flow from the hopper 30 through the distributing device (not shown), and toward the screed assembly 32. Any paving material 12 in front of the screed assembly 32 may be pre-compacted with a tamper bar (not shown), and then paved under the screed assembly according to a next step 108.

While aspects of the present disclosure have been particularly shown and described with reference to the embodiments above, it will be understood by those skilled in the art that various additional embodiments may be contemplated by the modification of the disclosed machines, systems and assemblies without departing from the scope of what is disclosed. Such embodiments should be understood to fall within the scope of the present disclosure as determined based upon the claims and any equivalents thereof.

What is claimed is:

1. A paving machine for paving a ground surface, the paving machine comprising:
   a chassis frame;
   a plurality of ground engaging mechanisms;
   a hopper mounted to the chassis frame and configured to receive paving material; and
   a rotary brush assembly, the rotary brush assembly including a frame mount for mounting the rotary brush assembly to the chassis frame, a mounting arm coupled to the frame mount, a motor coupled to the mounting arm, a drive shaft extending from the motor and through a mounting plate, the mounting plate including a plurality of apertures, the drive shaft defining an axis of rotation, and a plurality of blades extending radially outward from the drive shaft axis, each blade including a mounting end mounted to the mounting plate at one of the plurality of apertures and an opposite free end,
   a pitch of the rotary brush assembly being adjustable, the pitch being parallel to the ground surface, perpendicular to the ground surface, or an angle there between.

2. The paving machine of claim 1, wherein the paving machine includes a plurality of rotary brush assemblies.

3. The paving machine of claim 1, wherein the motor is electric or hydraulic.

4. The paving machine of claim 1, wherein the plurality of blades are positioned forward of the ground engaging mechanisms.

5. The paving machine of claim 1, wherein the rotary brush assembly is positioned by an operator of the paving machine such that the mounting plate is parallel to the ground surface.

6. The paving machine of claim 1, wherein an operator of the paving machine positions the rotary brush assembly such that the mounting plate is perpendicular to the ground surface.

7. The paving machine of claim 1, wherein an operator of the paving machine selectively extends and retracts the rotary brush assembly between an extended position and a retracted position.

8. The paving machine of claim 1, wherein during operation of the rotary brush assembly, the motor causes the plurality of blades to rotate in relation to the drive shaft axis, while rotating, an edge of each of the plurality of blades engages paving material and removes it from a path of each ground engaging mechanism.

9. The paving machine of claim 1, wherein each blade is made of a material flexible enough to allow each blade to initially conform its shape to the shape of any paving material the blade engages, and wherein each blade is made of a material rigid enough to transfer any paving material the blade engages out of a path of one of the ground engaging mechanism.

10. The paving machine of claim 9, wherein the plurality of blades includes eight rubber blades.

11. A rotary brush assembly for use with a paving machine, the rotary brush assembly comprising:
a frame mount for mounting the rotary brush assembly to a chassis frame of the paving machine;
a plurality of adjustable mounting arms;
a motor including a drive shaft;
a pair of mounting plates, the mounting plates being coupled to the drive shaft, each mounting plate including a plurality of apertures; and
a plurality of blades, each blade including a mounting end and an opposite free end, the mounting end installed between the pair of mounting plates at corresponding mounting plate apertures.

12. The rotary brush assembly of claim 11, wherein each blade is installed between the pair of mounting plates aligning a blade aperture in the mounting end of each blade with the corresponding mounting plate apertures and inserting a fastener through the mounting plate apertures and blade aperture.

13. The rotary brush assembly of claim 11, wherein at least one of the plurality of adjustable mounting arms is coupled to a hydraulic system of the paving machine.

14. The rotary brush assembly of claim 13, further including a controller for selectively extending and retracting the rotary brush assembly between an extended position and a retracted position, the controller being accessible to and operated by an operator of the paving machine.

15. The rotary brush assembly of claim 14, wherein the controller selectively adjusts an angle of the pair of mounting plates with respect to a ground surface.

16. The rotary brush assembly of claim 11, wherein the motor drives a rotation of the drive shaft, the rotation of the drive shaft causing rotation of the pair of mounting plates and the plurality of blades with respect to an axis defined by the drive shaft.

17. The rotary brush assembly of claim 16, wherein as the plurality of blades rotate, the free end of each blade engages paving material and transports it away from a path of a ground engaging element of the paving machine.

18. A method of paving using a rotary brush assembly with a plurality of blades, the method comprising:
transferring paving material from a supply source into a hopper of a paving machine, the paving machine having a ground engaging mechanism;
spilling a portion of the paving material into a path of the ground engaging mechanism;
adjusting, by an operator of the paving machine, a pitch of the rotary brush assembly, the pitch being one of parallel to a ground surface, perpendicular to the ground surface, and an angle there between;
engaging, by an edge of a blade of the plurality of blades, the spilled paving material;
sweeping, by the plurality of blades, the spilled paving material out of the path of the ground engaging mechanism; and
paving a portion of a ground surface with the transferred paving material.

19. The method of paving of claim 18, further including adjusting, by an operator of the paving machine, a position of the plurality of blades, the position being one of retracted and extended.

20. The method of paving of claim 18, further including adjusting, by the operator of the paving machine, a rotational direction of the plurality of blades, the rotational direction being one of clockwise and counter-clockwise.

* * * * *